(12) United States Patent
Suga et al.

(10) Patent No.: US 9,573,316 B2
(45) Date of Patent: Feb. 21, 2017

(54) BLOW MOLDING MOLD FOR PLASTIC BOTTLE

(71) Applicant: DAI NIPPON PRINTING CO., LTD., Tokyo-to (JP)

(72) Inventors: Yusuke Suga, Tokyo-to (JP); Takuma Miyawaki, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/780,598

(22) PCT Filed: Mar. 27, 2014

(86) PCT No.: PCT/JP2014/058736
§ 371 (c)(1),
(2) Date: Sep. 28, 2015

(87) PCT Pub. No.: WO2014/157447
PCT Pub. Date: Oct. 2, 2014

(65) Prior Publication Data
US 2016/0046062 A1    Feb. 18, 2016

(30) Foreign Application Priority Data

Mar. 27, 2013  (JP) .................................. 2013-066564
May 17, 2013  (JP) .................................. 2013-105463
(Continued)

(51) Int. Cl.
*B29C 49/48* (2006.01)
*B29C 33/04* (2006.01)
(Continued)

(52) U.S. Cl.
CPC ............ *B29C 49/4823* (2013.01); *B29C 33/04* (2013.01); *B29C 35/16* (2013.01); *B29C 49/06* (2013.01);
(Continued)

(58) Field of Classification Search
CPC ................... B29C 49/4823; B29C 2049/4887; B29C 2049/4892; B29C 2049/483
See application file for complete search history.

(56) References Cited

U.S. PATENT DOCUMENTS 3,843,286 A * 10/1974 Horberg, Jr. ............ B29C 49/56
                                                      425/183
3,857,660 A * 12/1974 Flynn .................... B29C 49/062
                                                      425/525
(Continued)

FOREIGN PATENT DOCUMENTS

DE    10 2010 006 898 A1    8/2011
EP           2 292 403 A1    3/2011
(Continued)

OTHER PUBLICATIONS

Jul. 1, 2014 International Search Report issued in International Patent Application No. PCT/JP2014/058736.
(Continued)

*Primary Examiner* — Robert B Davis
(74) *Attorney, Agent, or Firm* — Oliff PLC

(57) ABSTRACT

A blow molding mold which can reduce the production cost and can easily perform replacement work. The blow molding mold includes a body mold, a bottom mold and a neck mold. The neck mold is provided with a first cooling mechanism. The body mold includes an inner body mold corresponding to the outer surface of a body portion of a plastic bottle, and an outer shell located outside the inner body mold. The inner body mold can be attached/detached (Continued)

to/from the outer shell when replacing the inner body mold in conformity with the shape of the plastic bottle.

19 Claims, 12 Drawing Sheets

(30) Foreign Application Priority Data

Nov. 13, 2013 (JP) ................................. 2013-235198
Nov. 13, 2013 (JP) ................................. 2013-235212

(51) Int. Cl.
| | | |
|---|---|---|
| B29C 35/16 | (2006.01) | |
| B29L 31/00 | (2006.01) | |
| B29C 49/06 | (2006.01) | |
| B29K 101/12 | (2006.01) | |
| B29K 105/00 | (2006.01) | |

(52) U.S. Cl.
CPC .. *B29C 2035/1616* (2013.01); *B29C 2049/483* (2013.01); *B29C 2049/4828* (2013.01); *B29C 2049/4866* (2013.01); *B29C 2049/4887* (2013.01); *B29C 2049/4889* (2013.01); *B29C 2049/4892* (2013.01); *B29K 2101/12* (2013.01); *B29K 2105/258* (2013.01); *B29L 2031/7158* (2013.01)

(56) References Cited

U.S. PATENT DOCUMENTS

| | | | | |
|---|---|---|---|---|
| 4,701,121 A | * | 10/1987 | Jakobsen | .............. B29C 31/002 264/520 |
| 4,839,127 A | * | 6/1989 | Ajmera | ............... B29C 49/4823 264/526 |
| 5,560,943 A | | 10/1996 | Mero et al. | |
| 8,454,343 B2 | * | 6/2013 | Lane | ................... B29C 49/4823 249/102 |
| 2005/0006380 A1 | * | 1/2005 | Kagan | ..................... H05B 6/04 219/661 |
| 2010/0310704 A1 | * | 12/2010 | Rousseau | ........... B29C 49/4823 425/525 |
| 2011/0165285 A1 | | 7/2011 | Lane | |

FOREIGN PATENT DOCUMENTS

| | | |
|---|---|---|
| EP | 2 559 545 A1 | 2/2013 |
| JP | S57-20329 A | 2/1982 |
| JP | S58-173627 A | 10/1983 |
| JP | H03-76625 A | 4/1991 |
| JP | H06-179238 A | 6/1994 |
| JP | H08-25469 A | 1/1996 |

OTHER PUBLICATIONS

Sep. 1, 2016 Office Action issued in Chinese Patent Application No. 201480014757.4.
Nov. 7, 2016 Extended European Search Report issued in European Patent Application No. 14773561.7.

* cited by examiner

BLOW MOLDING MOLD FOR PLASTIC BOTTLE

CROSS-REFERENCE TO RELATED APPLICATIONS

This application claims priority to Japanese Patent Application No. 2013-66564, filed on Mar. 27, 2013, Japanese Patent Application No. 2013-105463, filed on May 17, 2013, Japanese Patent Application No. 2013-235198, filed on Nov. 13, 2013, and Japanese Patent Application No. 2013-235212, filed on Nov. 13, 2013, the disclosures of which are incorporated herein by reference in their entirety.

TECHNICAL FIELD

The present invention relates to a blow molding mold for a plastic bottle, and more particularly to a blow molding mold for a plastic bottle which can reduce the production cost and can be easily handled.

BACKGROUND ART

Plastic bottles are commonly used as beverage bottles these days. Such a plastic bottle can be obtained by placing a preform into a blow molding mold, and subjecting the preform to blow molding.

A blow molding mold for producing a plastic bottle includes a body mold, a bottom mold and a neck mold, corresponding to a body portion, a bottom portion and a neck portion, respectively, of the plastic bottle.

The body mold, the bottom mold and the neck mold are generally formed integrally. The whole blow molding mold, consisting of the body mold, the bottom mold and the neck mold, is replaced with a new one in conformity with the shape of a new plastic bottle.

SUMMARY OF THE INVENTION

Problems to be Solved by the Invention

As described above, a body mold, a bottom mold and a neck mold, constituting a blow molding mold, are generally formed integrally; therefore, it is necessary to replace the whole blow molding mold with a new one every time the shape of the plastic bottle is changed. A high cost is therefore required for the production of the new blow molding mold. Further, there is a demand for easy storage of an unused blow molding mold.

The present invention has been made in view of the above situation. It is therefore an object of the present invention to provide a blow molding mold for a plastic bottle which enables easy replacement of the mold, can reduce the overall production cost, and can be easily stored when not in use.

Means for Solving the Problems

A blow molding mold for a plastic bottle according to the present invention, configured to blow-mold a plastic bottle having a body portion, a bottom portion below the body portion, a mouth portion above the body portion, and a neck position located between the body portion and the mouth portion, comprises: a body mold corresponding to the body portion of the plastic bottle; a bottom mold corresponding to the bottom portion of the plastic bottle; and a neck mold corresponding to the neck portion of the plastic bottle, wherein the neck mold is provided with a first cooling mechanism; the body mold includes an inner body mold having an inner surface corresponding to the outer surface of the body portion, and an outer shell located outside the inner body mold; the inner body mold of the body mold can be attached/detached to/from the outer shell when replacing the inner body mold in conformity with the shape of the plastic bottle; and the first cooling mechanism has a coolant flow passage which extends in the neck mold and which overlaps the inner body mold in a plan view.

In an embodiment of the present invention, the bottom mold includes an outer bottom mold, and an inner bottom mold which is supported on the outer bottom mold and has an inner surface corresponding to the outer surface of the bottom portion of the plastic bottle; and the outer bottom mold and the inner bottom mold are provided with a second cooling mechanism.

In an embodiment of the present invention, the bottom mold is formed as a single integral member and is provided with a second cooling mechanism.

In an embodiment of the present invention, the blow molding mold further comprises an enclosure located outside the outer shell.

In an embodiment of the present invention, the enclosure is provided with a heating mechanism.

In an embodiment of the present invention, the outer shell is in engagement with the bottom mold.

In an embodiment of the present invention, the first cooling mechanism has an inlet and an outlet which communicate with the coolant flow passage; the coolant flow passage of the first cooling mechanism comprises an inlet-side coolant flow passage which communicates with the inlet, and an outlet-side coolant flow passage which is continuous with the inlet-side coolant flow passage and communicates with the outlet; and at least one of the inlet-side coolant flow passage and the outlet-side coolant flow passage overlaps the inner body mold in a plan view.

In an embodiment of the present invention, both of the inlet-side coolant flow passage and the outlet-side coolant flow passage overlap the inner body mold in a plan view.

In an embodiment of the present invention, the inlet-side coolant flow passage and the outlet-side coolant flow passage each have a crescent shape in a plan view.

In an embodiment of the present invention, the inlet-side coolant flow passage and the outlet-side coolant flow passage each include a plurality of linear portions.

In an embodiment of the present invention, branched portions are connected to the linear portions of the inlet-side coolant flow passage or the outlet-side coolant flow passage.

In an embodiment of the present invention, an insulating space is formed between the neck mold and the inner body mold.

Advantageous Effects of the Invention

According to the present invention, the body mold includes the inner body mold and the outer shell located outside the inner body mold, and the inner body mold can be attached/detached to/from the outer shell when replacing the inner body mold in conformity with the shape of the plastic bottle. Thus, when the shape of the plastic bottle is changed, only the inner body mold can be replaced by detaching it from the outer shell and attaching a new inner body mold to the outer shell. This can eliminate the need to replace the whole blow molding mold every time the shape of the plastic bottle is changed, thereby reducing the production cost of the blow molding mold.

DESCRIPTION OF THE PREFERRED EMBODIMENTS

First Embodiment

A first embodiment of the present invention will now be described with reference to the drawings. FIGS. 1 through 4 are diagrams illustrating the first embodiment of the present invention.

Figure 5:
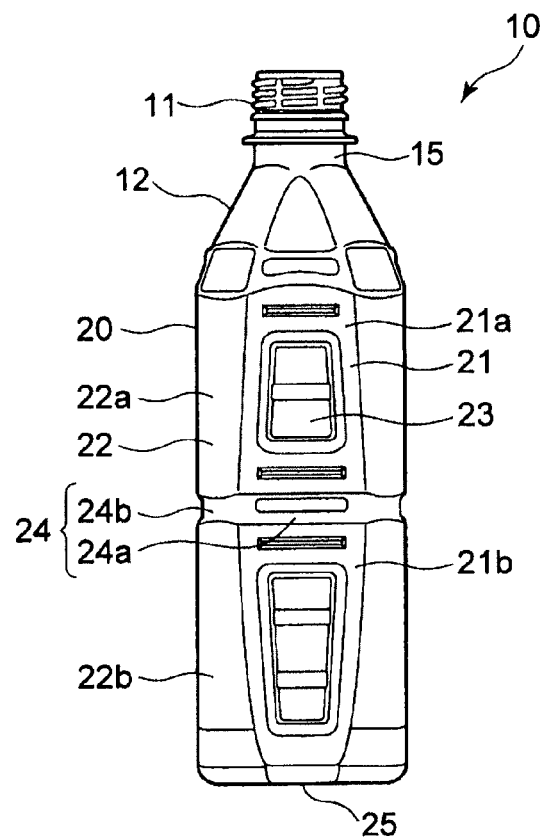
FIG. 5 is a front view of a plastic bottle obtained in the blow molding mold according to the present invention.
Figure 6:
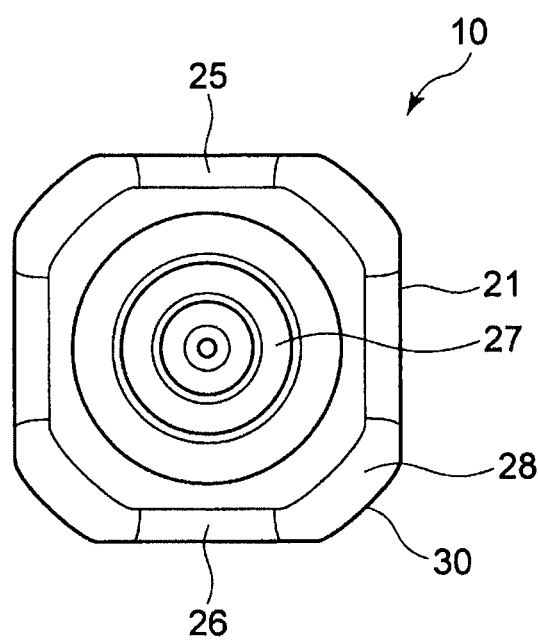
FIG. 6 is a bottom view of the plastic bottle.

A plastic bottle 10, obtained by a blow molding mold for a plastic bottle according to the present invention, will be described first with reference to FIGS. 5 and 6. The plastic bottle 10, which is obtained by blow molding using the below-described blow molding mold 30, includes a mouth portion 11, a body portion 20 provided below the mouth portion 11, and a bottom portion 25 provided below the body portion 20.

The body portion 20 has a plurality of, e.g. four, side surfaces 21 having the same shape, and has a generally polygonal cylindrical shape, e.g. a square cylindrical shape, as a whole. A flat boundary surface 22 is formed between two adjacent side surfaces 21. A shoulder portion 12, constituting part of the body portion 20, is formed between the side surfaces 21/the boundary surfaces 22 and the mouth portion 11.

The four side surfaces 21 of the body portion 20 are each divided into an upper area 21a and a lower area 21b by a horizontal recessed side-surface rib 24a which is recessed inwardly (toward the inside of the bottle 10). The four boundary surfaces 22 are also each divided into an upper area 22a and a lower area 22b by a horizontal recessed boundary-surface rib 24b projecting inwardly (toward the inside of the bottle 10).

The horizontal recessed side-surface ribs 24a and the horizontal recessed boundary-surface ribs 24b constitute horizontal recessed ribs 24.

A flat plate-shaped panel portion 23 is provided in each of the upper area 21a and the lower area 21b of each side surface 21 of the body portion 20. The panel portions 23 absorb the pressure applied to the plastic bottle 10 upon expansion or depressurization of the interior of the plastic bottle 10.

An inwardly recessed neck portion 15 is formed between the shoulder portion 12 of the body portion 20 and the mouth portion 11.

The bottom portion 26 includes a peripheral portion 26 and a central portion 27 lying inside the peripheral portion 26 and raised up from the peripheral portion 26.

The plastic bottle 10 can be produced by a process comprising preparing a preform by injection molding of a synthetic resin material, and subjecting the preform to biaxial-orientation blow molding using a blow molding mold. A thermoplastic resin, in particular PE (polyethylene), PP (polypropylene), PET (polyethylene terephthalate) or PEN (polyethylene naphthalate), is preferably used as a material for the preform, i.e. for the plastic bottle 10.

The plastic bottle 10 may be formed as a multi-layer molded bottle composed of two or more layers. For example, a preform composed of three or more layers, having an intermediate layer made of a resin having gas barrier properties and light blocking properties, is prepared by extrusion molding or injection molding. Examples of the intermediate layer include MXD6, MXD6+fatty acid salt, PGA (polyglycolic acid), EVOH (ethylene-vinyl alcohol copolymer), PEN (polyethylene naphthalate), etc. The preform is subjected to blow molding to produce a multi-layer bottle having gas barrier properties and light blocking properties.

The plastic bottle 10 may also be produced by a method comprising mixing an inert gas (nitrogen gas, argon gas) into a melt of a thermoplastic resin to produce a foamed preform having a foamed cell diameter of 0.5 to 100 µm, and subjecting the foamed preform to blow molding. The plastic bottle 10 contains foamed cells, and can therefore have enhanced light blocking properties.

It is also possible to use a blend of thermoplastic resins as a material for the plastic bottle 10 to impart gas barrier properties and light blocking properties to the plastic bottle 10.

A blow molding mold 30 for a plastic bottle according to the present invention will now be described with reference to FIGS. 1 through 4.

The blow molding mold 30 for a plastic bottle includes a body mold 31 corresponding to the body portion 20 of the plastic bottle 10, a bottom mold 35 corresponding to the bottom portion 25 of the plastic bottle 10, and a neck mold 38 corresponding to the neck portion 15 of the plastic bottle 10.

The body mold 31 includes an inner body mold 32 having an inner surface 32a corresponding to the outer surface of the body portion 20, and an outer shell 33 located outside the inner body mold 32. The inner body mold 32 and the outer shell 33 each have division surfaces by which they are vertically divided into two portions.

The bottom mold 35 includes an outer bottom mold 36, and an inner bottom mold 37 which is supported on the outer bottom mold 36 and has an inner surface 37a corresponding to the outer surface of the bottom portion 25 of the plastic bottle 10.

The neck mold 38 is provided with a first cooling mechanism 38A having a cooling water inlet 38a and a cooling water outlet 38b. Cooling water is allowed to flow from the cooling water inlet 38a into a cooling water flow passage 38c provided in the neck mold 38, and the cooling water is discharged from the cooling water outlet 38b. This can effectively cool the neck mold 38.

The positional relationship between the neck mold 38, the first cooling mechanism 38A provided in the neck mold 3, and the inner body mold 32 will now be described with reference to FIGS. 7A through 7C.

Figure 7A:
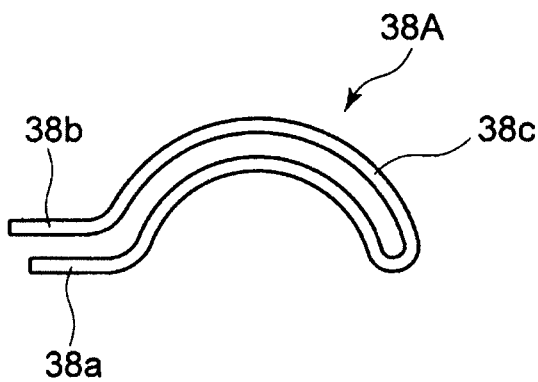
FIGS. 7A through 7C are diagrams showing the positional relationship between the neck mold, a first cooling mechanism and the inner body mold.
Figure 7B:
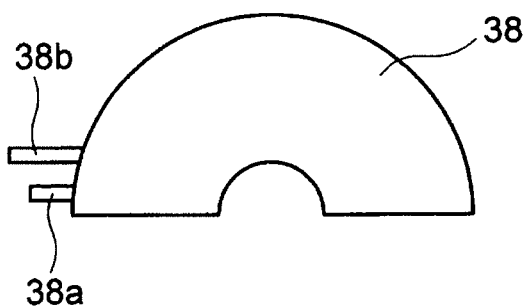
Figure 7C:
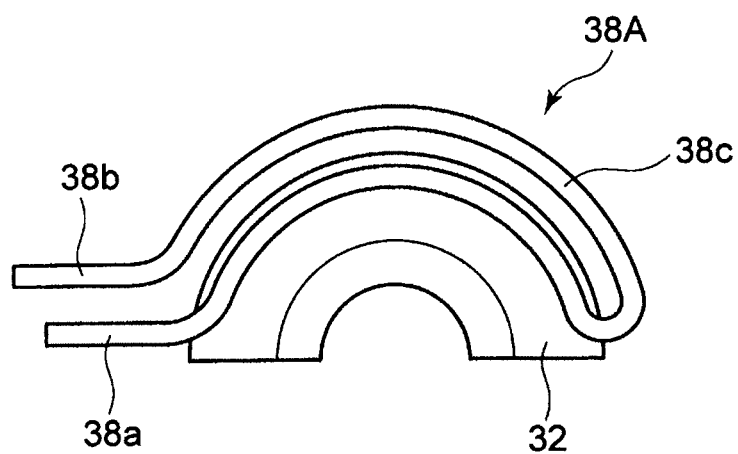

FIG. 7A is a plan view of the first cooling mechanism 38A, FIG. 7B is a plan view showing the positional relationship between the neck mold 38 and the first cooling mechanism 38A, and FIG. 7C is a plan view showing the positional relationship between the first cooling mechanism 38A and the inner body mold 32.

As shown in FIGS. 7A through 7C, the first cooling mechanism 38A includes the cooling water inlet 38a, the cooling water outlet 38b, and the cooling water flow passage 38c provided in the neck mold 38.

In this embodiment, the cooling water flow passage 38c of the first cooling mechanism 38A overlaps the inner body mold 32 in a plan view.

Because of the overlap between the cooling water flow passage 38c of the first cooling mechanism 38A and the inner body mold 32 in a plan view, the first cooling mechanism 38A can securely cool the neck mold 38: In the case where the cooling water flow passage 38c for cooling the neck mold 38 is located at a distance from the inner body mold 32 in a plan view, when an enclosure 40, the outer shell 33 and the inner body mold 32 are heated by water, pressurized water or an oil which is temperature-regulated, as described below, the heat from the inner body mold 32 makes it difficult to sufficiently cool the neck mold 38. According to this embodiment, on the other hand, the cooling water flow passage 38c overlaps the inner body mold 32 in a plan view. Therefore, even when the neck mold 38 is somewhat heated by the inner body mold 32, the neck mold 38 can be securely cooled by cooling water flowing in the cooling water flow passage 38c.

The outer bottom mold 36 and the inner bottom mold 37 are provided with a second cooling mechanism 36A having a cooling water inlet 36a and a cooling water outlet 36b. Cooling water is allowed to flow from the cooling water inlet 36a into a cooling water flow passage (not shown) provided in the outer bottom mold 36 and the inner bottom mold 37, and the cooling water is discharged from the cooling water outlet 36b. This can effectively cool the outer bottom mold 36 and the inner bottom mold 37.

The lower end of the outer shell 33 of the body mold 31 is in engagement with the outer bottom mold 36.

Figure 1:
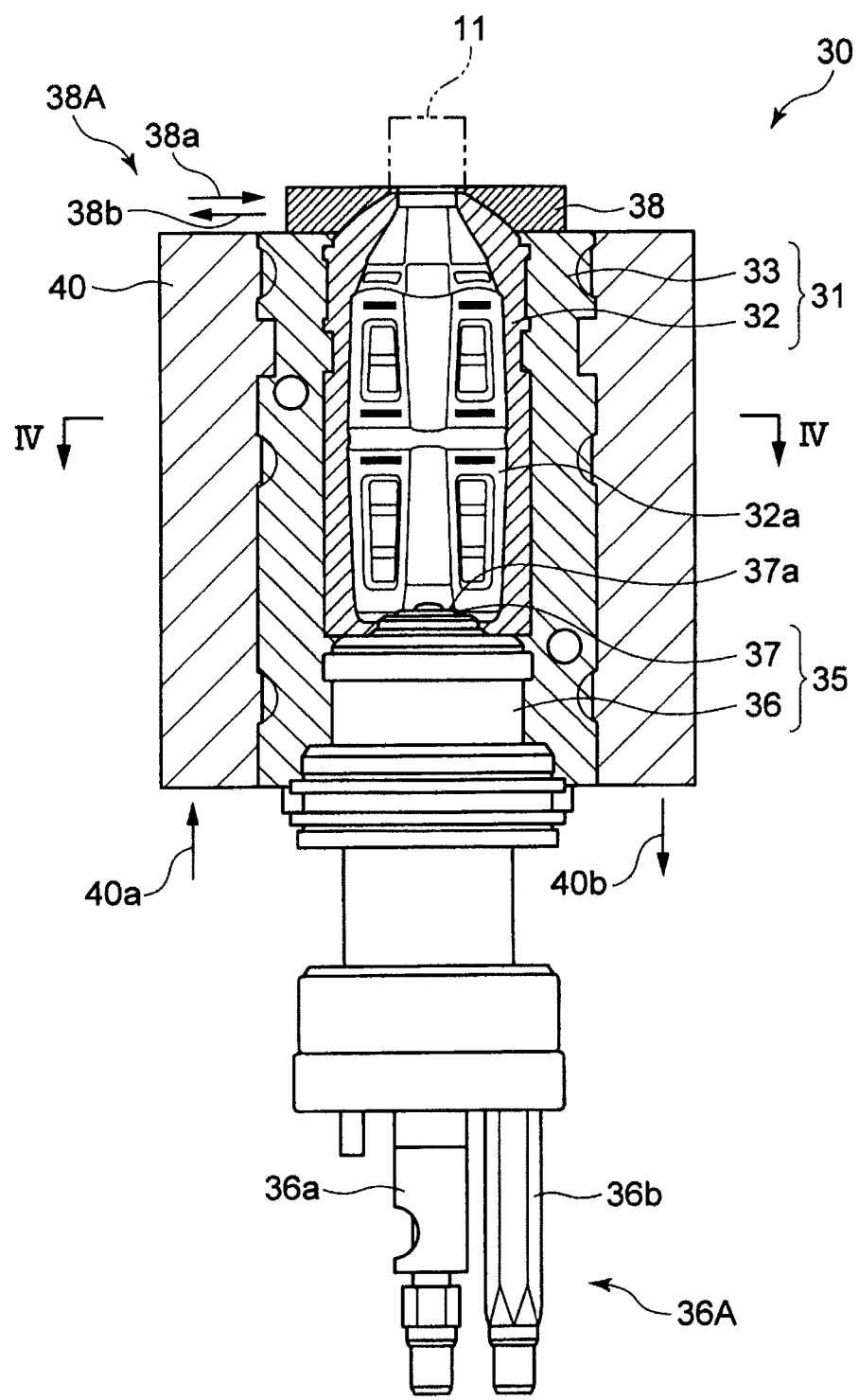
FIG. 1 is a partial cross-sectional view showing a first embodiment of a blow molding mold for a plastic bottle according to the present invention.
Figure 2A:
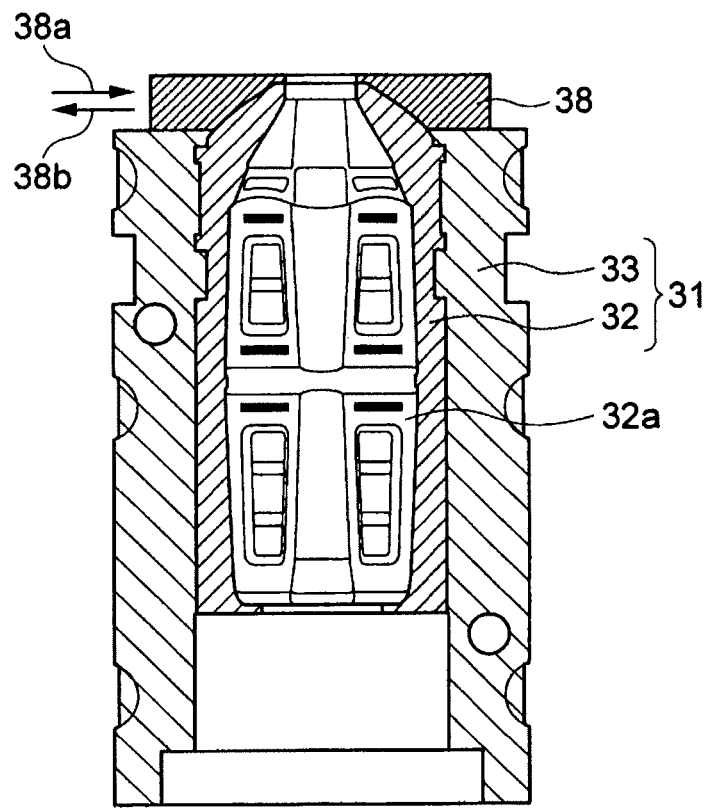
FIG. 2A is a partial cross-sectional view of a body mold and a neck mold.
Figure 2B:
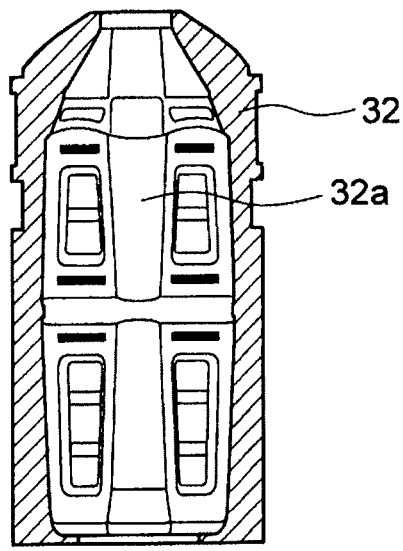
FIG. 2B is a partial cross-sectional view of an inner body mold.
Figure 3A:
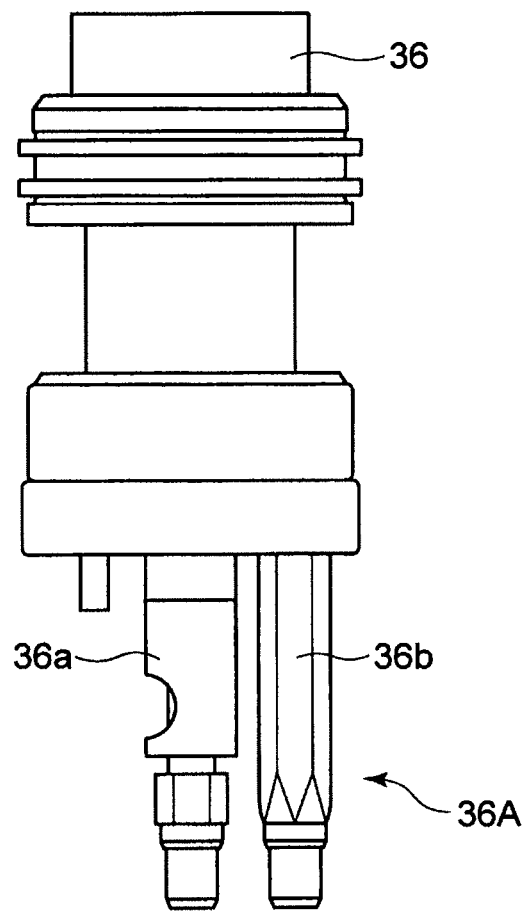
FIG. 3A is a diagram of an outer bottom mold.
Figure 3B:
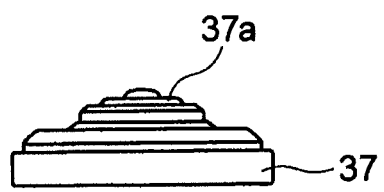
FIG. 3B is a diagram of an inner bottom mold.
Figure 4:
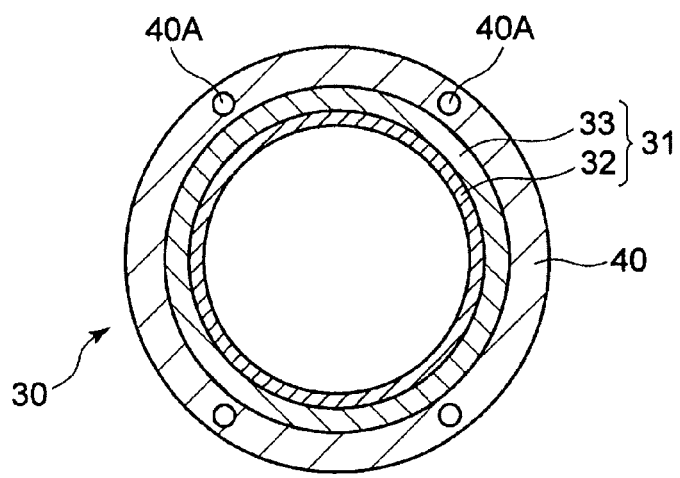
FIG. 4 is a cross-sectional view taken along the line IV-IV of FIG. 1.

As shown in FIGS. 1 and 4, an enclosure 40 which surrounds the outer shell 33 of the body mold 31 is provided outside the outer shell 33. In the enclosure 40 is formed a temperature-regulated medium flow passage 40A into which water, pressurized water or an oil, which is temperature-regulated, flows. The temperature-regulated water, pressurized water or oil flows from an inlet 40a into the temperature-regulated medium flow passage 40A of the enclosure 40 and heats the enclosure 40, and is discharged to the outside from an outlet 40b. The enclosure 40 has division surfaces by which the enclosure 40 is vertically divided into two portions.

The body mold 31 is composed of the inner body mold 32 and the outer shell 33 located outside the inner body mold 32. The inner body mold 32 can be detached from the outer shell 33, and a new inner body mold 32, having a surface shape conforming to the outer shape of the body portion 20 of a new plastic bottle 10, can be fit into the outer shell 33.

Similarly, the bottom mold 35 is composed of the outer bottom mold 36 and the inner bottom mold 37. The inner bottom mold 37 can be detached from the outer bottom mold 36, and a new inner bottom mold 37, having a surface shape conforming to the outer shape of the bottom portion 25 of a new plastic bottle 10, can be mounted on the outer bottom mold 36.

The operation of the blow molding mold of this embodiment having the above-described construction will now be described.

First, an inner body mold 32 of the body mold 31 is selected in conformity with the shape of the body portion 20 of a plastic bottle 10 to be obtained by blow molding, and the inner body mold 32 is fit into the outer shell 33. Similarly, an inner bottom mold 37 is selected in conformity with the shape of the bottom portion 25 of the plastic bottle 10, and the inner bottom mold 37 is mounted on the outer bottom mold 36.

Next, a preform is prepared and heated. The heated preform is placed into the blow molding mold 30 in an open state, and then the blow molding mold 30 is closed tightly.

While stretching the preform from the mouth portion 11 of the preform by means of a stretching rod, the preform is subjected to blow molding by blowing air into the preform, thereby producing a plastic bottle 10.

During the blow molding, water, pressurized water or an oil, which is temperature-regulated, is allowed to flow from the inlet 40a into the temperature-regulated medium flow passage 40A of the enclosure 40, and the temperature-regulated water, pressurized water or oil is discharged from the outlet 40b. This can heat the outer shell 33 and the inner body mold 32 from the enclosure 40, making it possible to appropriately perform blow molding on the preform in the blow molding mold 30.

The plastic bottle 10 can be obtained by performing blow molding on the preform in the blow molding mold 30 in the above-described manner.

Further, during the blow molding, the neck portion 15 and the bottom portion 25 of the plastic bottle 10 are cooled in the blow molding mold 30 by cooling the neck mold 38 by means of the first cooling mechanism 38A and cooling the outer bottom mold 36 and the inner bottom mold 37 by means of the second cooling mechanism 36A.

The neck portion 15 of the plastic bottle 10, which is non-stretched and thick and is hard to cool, can be cooled by the neck mold 38, and the non-stretched thick bottom portion 25 of the plastic bottle 10 can be cooled by the outer bottom mold 36 and the inner bottom mold 37.

Thereafter, the blow molding mold 30 is opened, so that the plastic bottle 10 can be taken out of the blow molding mold 30.

When the shape of the plastic bottle 10 is changed, the inner body mold 32 is detached from the outer shell 33, and a new inner body mold 32, corresponding to the shape of the body portion 20 of the plastic bottle 10, is selected and fit into the outer shell 33.

Further, the inner bottom mold 37 is detached from the outer bottom mold 36, and a new inner bottom mold 37, corresponding to the shape of the bottom portion 25, is selected and mounted on the outer bottom mold 36.

As described above, according to this embodiment, there is no need to replace the whole blow molding mold 30 when changing the shape of the plastic bottle 10: A new blow molding mold 30, conforming to the shape of the new plastic bottle 10, can be constructed by replacing only the inner body mold 32 and the inner bottom mold 37 with new ones in conformity with the shape of the new plastic bottle 10. The inner body mold 32 to be replaced is significantly lighter in weight and smaller in size than the whole body mold 31 comprising the combination of the inner body mold 32 and the outer shell 33. Similarly, the inner bottom mold 37 to be replaced is significantly lighter in weight and smaller in size than the whole bottom mold 35 comprising the combination of the inner bottom mold 37 and the outer bottom mold 36.

The members which are to be replaced in conformity with the shape of the plastic bottle 10 can thus be made significantly small-sized and lightweight. Therefore, compared to the case where the whole blow molding mold 30 is replaced with a new one every time the shape of the plastic bottle 10 is changed, the production cost of the blow molding mold 30 can be reduced.

Further, it is only necessary to replace the inner body mold 32 and the inner bottom mold 37 with new ones in conformity with the shape of the plastic bottle 10. This enables easy storage and easy handling of replacement parts.

Further, there is no need to replace the neck mold 38 having the first cooling mechanism 38A and the outer bottom mold 36 having the second cooling mechanism 36A when changing the shape of the plastic bottle 10. Therefore, it is no longer necessary to perform operations for attachment/detachment of the first cooling mechanism 38A and the second cooling mechanism 36A upon replacement of the blow molding mold 30. This facilitates replacement work on the blow molding mold 30.

Figure 8:
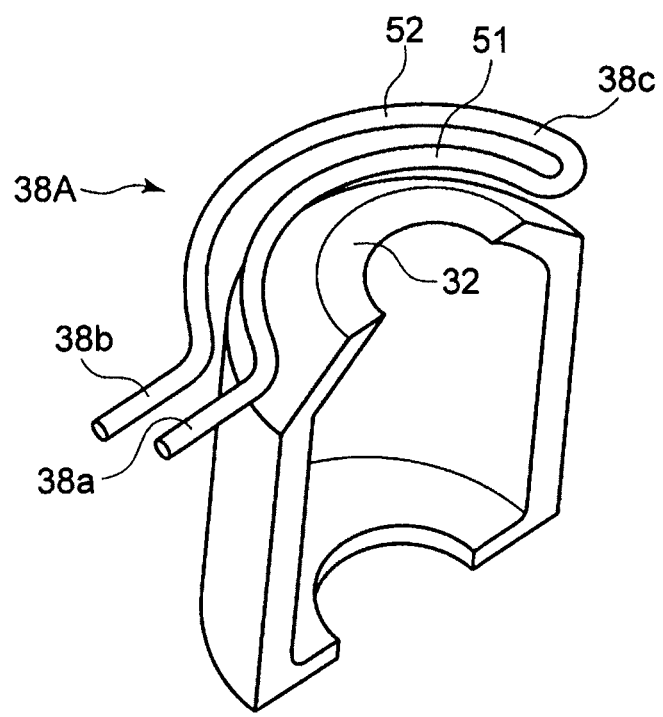
FIG. 8 is a perspective view showing the positional relationship between the first cooling mechanism and the inner body mold.

The positional relationship between the first cooling mechanism 38A and the inner body mold 32 will now be described with reference to FIG. 8. FIG. 8 is a perspective view showing the positional relationship between the first cooling mechanism 38A and the inner body mold 32.

As described above, the first cooling mechanism 38A includes the cooling water inlet 38a, the cooling water outlet 38b, and the cooling water flow passage 38c provided in the neck mold 38 (see FIGS. 7A through 7C). As shown in FIG. 8, the cooling water flow passage 38c comprises an inlet-side cooling water flow passage 51 which communicates with the cooling water inlet 38a, and an outlet-side cooling water flow passage 52 which is continuous with the inlet-side cooling water flow passage 51 and communicates with the cooling water outlet 38b. One of the inlet-side cooling water flow passage 51 and the outlet-side cooling water flow passage 52, e.g. the outlet-side cooling water flow passage 52, overlaps the inner body mold 32 in a plan view.

The inlet-side cooling water flow passage 51 and the outlet-side cooling water flow passage 52 both have a crescent shape in a plan view.

Variations

A variation of the present invention will now be described with reference to FIGS. 9A and 9B. While in the above-described embodiment the outlet-side cooling water flow passage 52 of the cooling water flow passage 38c overlaps the inner body mold 32 in a plan view, both of the inlet-side cooling water flow passage 51 and the outlet-side cooling water flow passage 52 of the cooling water flow passage 38c may overlap the inner body mold 32 in a plan view.

Figure 9A:
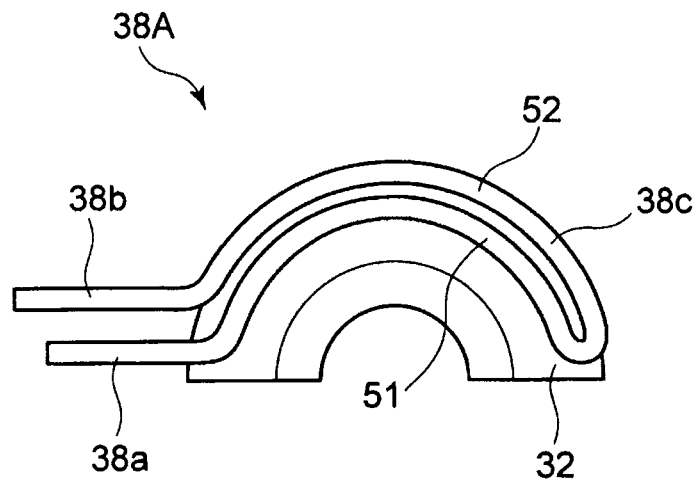
FIG. 9A is a plan view showing the positional relationship between the first cooling mechanism and the inner body mold.
Figure 9B:
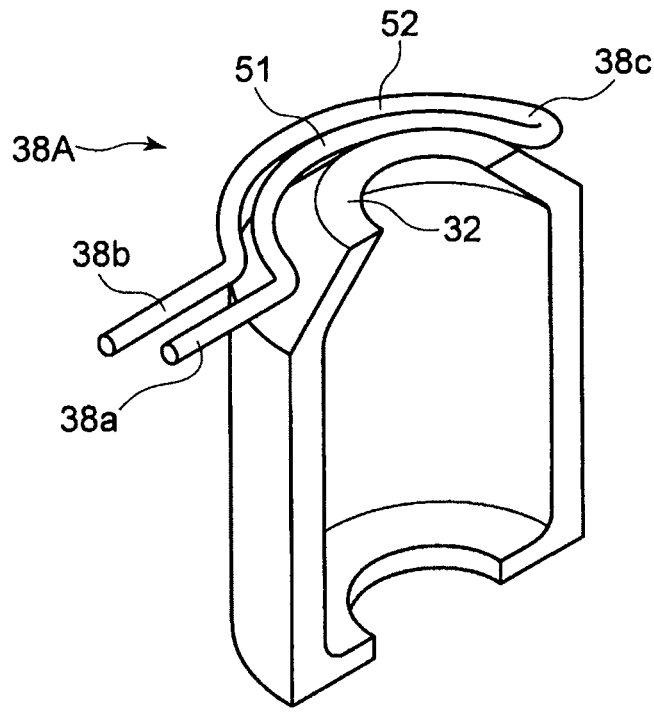
FIG. 9B is a perspective view showing the positional relationship.

For the variation shown in FIGS. 9A and 9B, the same reference numerals are used to refer to the same or like members or components, and a detailed description thereof is omitted.

According to this variation, both of the inlet-side cooling water flow passage 51 and the outlet-side cooling water flow passage 52 of the cooling water flow passage 38c overlap the inner body mold 32 in a plan view. Therefore, even when the neck mold 38 is somewhat heated by the inner body mold 32, the neck mold 38 can be securely cooled by cooling water flowing in the inlet-side cooling water flow passage 51 and the outlet-side cooling water flow passage 52.

Figure 10A:
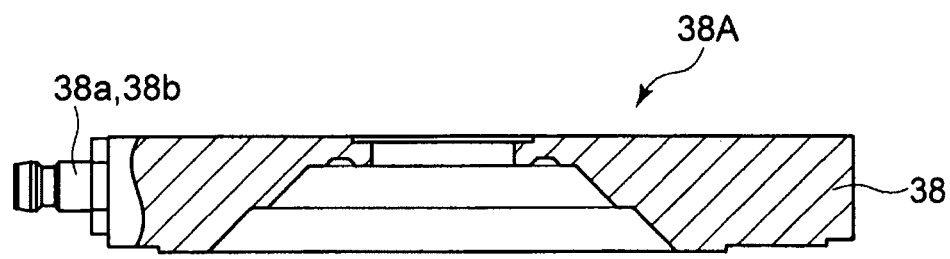
FIG. 10A is a side cross-sectional view of the neck mold and a first cooling mechanism.
Figure 10B:
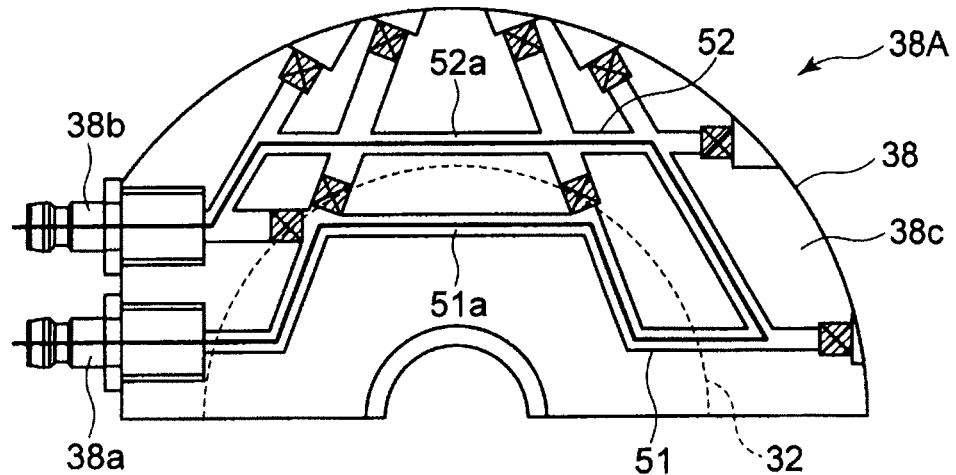
FIG. 10B is a cross-sectional view showing the positional relationship between the neck mold, the first cooling mechanism and the inner body mold.

Another variation of the present invention will now be described with reference to FIGS. 10A and 10B. In the above-described embodiment and variation, the cooling water flow passage 38c of the first cooling mechanism 38A comprises the inlet-side cooling water flow passage 51 and the outlet-side cooling water flow passage 52 and, in addition, the inlet-side cooling water flow passage 51 and the outlet-side cooling water flow passage 52 both have a crescent shape in a plan view. However, the inlet-side cooling water flow passage 51 may comprise a plurality of linear portions 51a (FIGS. 10A and 10B). The outlet-side cooling water flow passage 52 also comprises a plurality of linear portions 52a.

For the variation shown in FIGS. 10A and 10B, the same reference numerals are used to refer to the same or like members or components, and a detailed description thereof is omitted.

Cooling water that has been supplied into the inlet-side cooling water flow passage 51 reaches the linear portions 51a. The cooling water flowing in the linear portions 51a can cool the neck mold 38.

As shown in FIGS. 10A and 10B, of the inlet-side cooling water flow passage 51 and the outlet-side cooling water flow passage 52 which constitute the cooling water flow passage 38c of the first cooling mechanism 38A, the inlet-side cooling water flow passage 51 overlaps the inner body mold 32 in a plan view.

Figure 11:
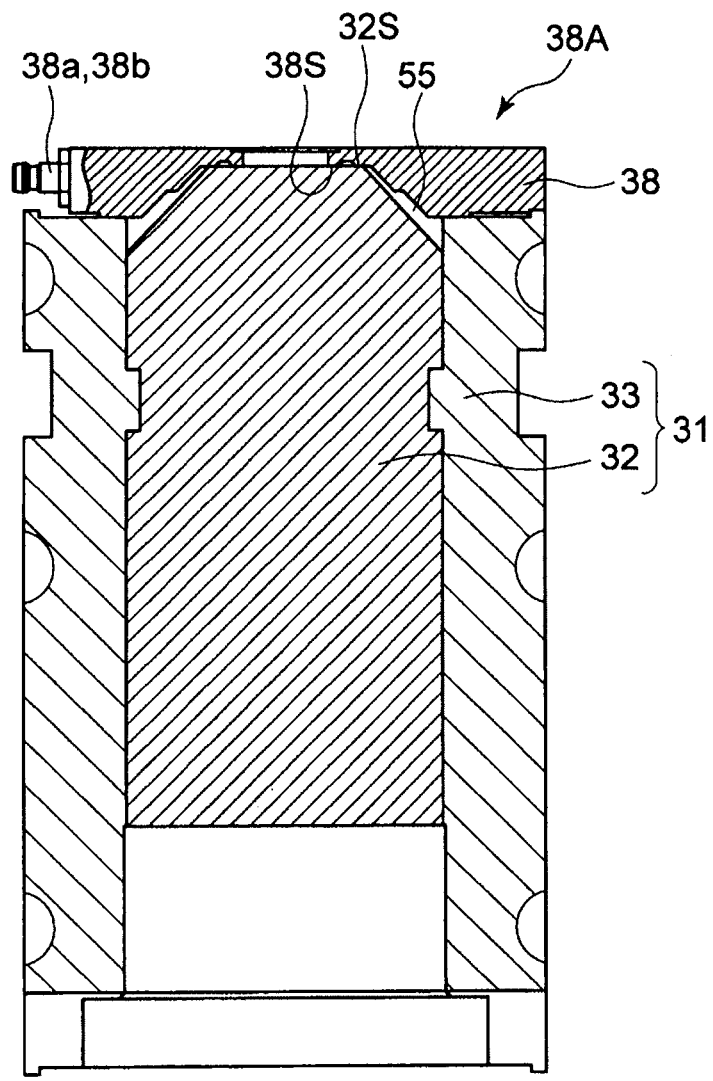
FIG. 11 is a cross-sectional view showing an insulating space formed between the neck mold and the inner body mold.

For the variation shown in FIG. 11, the same reference numerals are used to refer to the same or like members or components, and a detailed description thereof is omitted.

Yet another variation of the present invention will now be described with reference to FIG. 11.

FIG. 11 is a cross-sectional view showing an insulating space 55 formed between the neck mold 38 and the inner body mold 32. As shown in FIG. 11, the insulating space 55 is formed between the neck mold 38 and the inner body mold 32 by contact between the contact surface 38s of the neck mold 38 and the contact surface 32s of the inner body mold 32. The insulating space 55 may be wholly or partly filled with an insulating material (ceramic material).

FIG. 11 schematically shows a cross-section of the neck mold 38 and the outer shape of the inner body mold 32.

As shown in FIG. 11, the insulating space 55 having a gap thickness of 0.5 mm to 5.0 mm is formed between the neck mold 38 and the inner body mold 32 over the entire boundary between them.

As described above, the enclosure 40, the outer shell 33 and the inner body mold 32 are heated by water, pressurized water or an oil which is temperature-regulated. The insulating space 55, formed between the neck mold 38 and the inner body mold 32, can reduce propagation of heat to the neck mold 38. In addition, due to the cooling effect of the first cooling mechanism 38A on the neck mold 38, the neck mold 38 can be prevented from being heated to a high temperature.

Second Embodiment

A blow molding mold 30 for a plastic bottle according to a second embodiment of the present invention will now be described with reference to FIGS. 12 and 13.

Figure 12:
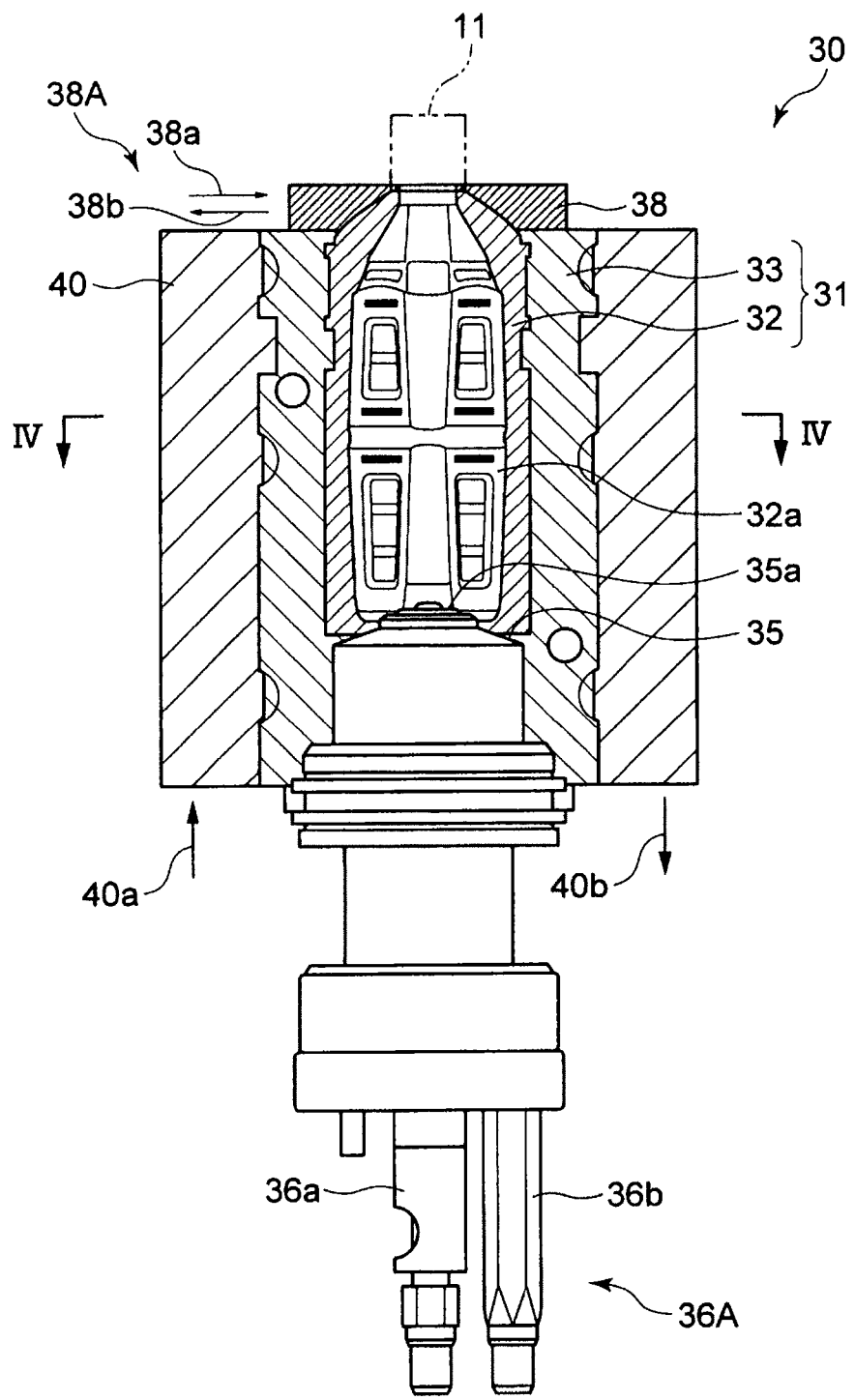
FIG. 12 is a partial cross-sectional view showing a second embodiment of a blow molding mold for a plastic bottle according to the present invention.
Figure 13:
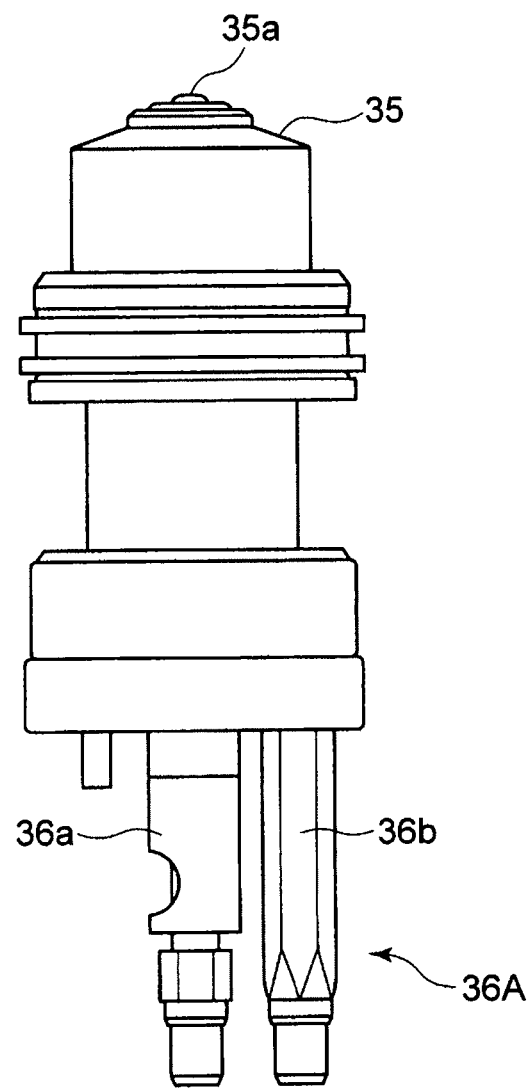
FIG. 13 is a diagram of a bottom mold.

For the second embodiment shown in FIGS. 12 and 13, the same reference numerals are used to refer to the same or like members or components, and a detailed description thereof is omitted.

The blow molding mold 30 for a plastic bottle includes a body mold 31 corresponding to the body portion 20 of the plastic bottle 10, a bottom mold 35 corresponding to the bottom portion 25 of the plastic bottle 10, and a neck mold 38 corresponding to the neck portion 15 of the plastic bottle 10.

The body mold 31 includes an inner body mold 32 having an inner surface 32a corresponding to the outer surface of the body portion 20, and an outer shell 33 located outside the inner body mold 32. The inner body mold 32 and the outer shell 33 each have division surfaces by which they are vertically divided into two portions.

The bottom mold 35 is formed as a single integral member and has an inner surface 35a formed in the upper surface.

The bottom mold 35 is provided with a second cooling mechanism 36A including a cooling water inlet 36a and a cooling water outlet 36b. Cooling water is allowed to flow from the cooling water inlet 36a into a cooling water flow passage (not shown) provided in the bottom mold 35, and the cooling water is discharged from the cooling water outlet 36b. This can effectively cool the bottom mold 35.

The lower end of the outer shell 33 of the body mold 31 is in engagement with the bottom mold 35.

As shown in FIG. 12, an enclosure 40 which surrounds the outer shell 33 of the body mold 31 is provided outside the outer shell 33. In the enclosure 40 is formed a temperature-regulated medium flow passage 40A into which water, pressurized water or an oil, which is temperature-regulated, flows. The temperature-regulated water, pressurized water or oil flows from an inlet 40a into the temperature-regulated medium flow passage 40A of the enclosure 40 and heats the enclosure 40, and is discharged to the outside from an outlet 40b. The enclosure 40 has division surfaces by which the enclosure 40 is vertically divided into two portions.

The body mold 31 is composed of the inner body mold 32 and the outer shell 33 located outside the inner body mold 32. The inner body mold 32 can be detached from the outer shell 33, and a new inner body mold 32, having a surface shape conforming to the outer shape of the body portion 20 of a new plastic bottle 10, can be fit into the outer shell 33.

The bottom mold 35 can be attached/detached to/from the blow molding mold 30 so that it can be replaced with a new bottom mold 35 having a surface shape conforming to the outer shape of the bottom portion 25 of a new plastic bottle 10.

The operation of the blow molding mold of this embodiment having the above-described construction will now be described.

First, an inner body mold 32 of the body mold 31 is selected in conformity with the shape of the body portion 20 of a plastic bottle 10 to be obtained by blow molding, and the inner body mold 32 is fit into the outer shell 33. Similarly, a bottom mold 35 is selected in conformity with the shape of the bottom portion 25 of the plastic bottle 10, and the bottom mold 35 is mounted on the blow molding mold 30.

As described above, the bottom mold 35 is configured to be attachable/detachable to/from the blow molding mold 30 and, in addition, the bottom mold 35 is formed as a single integral member. Therefore, the bottom mold 35 can be attached/detached to/from the blow molding mold 30 easily in a simple manner when replacing the bottom mold 35 in conformity with the shape of the bottom portion of a new plastic bottle 10.

Next, a preform is prepared and heated. The heated preform is placed in the blow molding mold 30 in an open state, and then the blow molding mold 30 is closed tightly.

While stretching the preform from the mouth portion 11 of the preform by means of a stretching rod, the preform is subjected to blow molding by blowing air into the preform, thereby producing a plastic bottle 10.

During the blow molding, water, pressurized water or an oil, which is temperature-regulated, is allowed to flow from the inlet 40a into the temperature-regulated medium flow passage 40A of the enclosure 40, and the temperature-regulated water, pressurized water or oil is discharged from the outlet 40b. This can heat the outer shell 33 and the inner body mold 32 from the enclosure 40, making it possible to appropriately perform blow molding on the preform in the blow molding mold 30.

The plastic bottle 10 can be obtained by performing blow molding on the preform in the blow molding mold 30 in the above-described manner.

Further, during the blow molding, the neck portion 15 and the bottom portion 25 of the plastic bottle 10 are cooled in the blow molding mold 30 by cooling the neck mold 38 by means of the first cooling mechanism 38A and cooling the outer bottom mold 36 and the inner bottom mold 37 by means of the second cooling mechanism 36A.

The neck portion 15 of the plastic bottle 10, which is non-stretched and thick and is hard to cool, can be cooled by the neck mold 38, and the non-stretched thick bottom portion 25 of the plastic bottle 10 can be securely cooled by the bottom mold 35.

Thereafter, the blow molding mold 30 is opened, so that the plastic bottle 10 can be taken out of the blow molding mold 30.

When the shape of the plastic bottle 10 is changed, the inner body mold 32 is detached from the outer shell 33, and a new inner body mold 32, corresponding to the shape of the body portion 20 of the plastic bottle 10, is selected and fit into the outer shell 33.

Further, the bottom mold 35 is detached from the blow molding mold 30, and a new bottom mold 35, corresponding to the shape of the bottom portion 25, is selected and mounted on the blow molding mold 30.

As described above, according to this embodiment, there is no need to replace the whole blow molding mold 30 when changing the shape of the plastic bottle 10: A new blow molding mold 30, conforming to the shape of the new plastic bottle 10, can be constructed by replacing only the inner body mold 32 and the bottom mold 35 with new ones in conformity with the shape of the new plastic bottle 10. The inner body mold 32 to be replaced is significantly lighter in weight and smaller in size than the whole body mold 31 comprising the combination of the inner body mold 32 and the outer shell 33.

The members which are to be replaced in conformity with the shape of the plastic bottle 10 can thus be made significantly small-sized and lightweight. Therefore, compared to the case where the whole blow molding mold 30 is replaced with a new one every time the shape of the plastic bottle 10 is changed, the production cost of the blow molding mold 30 can be reduced.

Since the bottom mold 35 is formed as a single integral member, replacement work on the bottom mold 35 can be performed easily in a simple manner.

Further, it is only necessary to replace the inner body mold 32 and the bottom mold 35 with new ones in conformity with the shape of the plastic bottle 10. This enables easy storage and easy handling of replacement parts.

Further, there is no need to replace the neck mold 38 having the first cooling mechanism 38A. Therefore, it is no longer necessary to perform attachment/detachment operations on the first cooling mechanism 38A upon replacement of the blow molding mold 30. This facilitates replacement work on the blow molding mold 30.

DESCRIPTION OF THE REFERENCE NUMERALS 10 plastic bottle
11 mouth portion
12 shoulder portion
15 neck portion
20 body portion
21 side surface
22 boundary surface
25 bottom portion
30 blow molding mold
31 body mold
32 inner body mold
33 outer shell
35 bottom mold
35a inner surface
36 outer bottom mold
36A second cooling mechanism
36a inlet
36b outlet
37 inner bottom mold
38 neck mold
38A first cooling mechanism
38a inlet
38b outlet
38c cooling water flow passage
40 enclosure
51 inlet-side cooling water flow passage
51a linear portion
51b branched portion
52 outlet-side cooling water flow passage
52a linear portion
55 insulating space

The invention claimed is:

1. A blow molding mold for a plastic bottle, configured to blow-mold a plastic bottle having a body portion, a bottom portion below the body portion, a mouth portion above the body portion, and a neck position located between the body portion and the mouth portion, comprising:
   a body mold corresponding to the body portion of the plastic bottle;
   a bottom mold corresponding to the bottom portion of the plastic bottle; and
   a neck mold corresponding to the neck portion of the plastic bottle, wherein the neck mold is provided with a first cooling mechanism; the body mold includes an inner body mold having an inner surface corresponding to the outer surface of the body portion, and an outer shell located outside the inner body mold; the inner body mold of the body mold can be attached/detached to/from the outer shell when replacing the inner body mold in conformity with the shape of the plastic bottle; and the first cooling mechanism has a coolant flow passage which extends in the neck mold and which overlaps the inner body mold in a plan view.

2. The blow molding mold for a plastic bottle according to claim 1, wherein the bottom mold includes an outer bottom mold, and an inner bottom mold which is supported on the outer bottom mold and has an inner surface corresponding to the outer surface of the bottom portion of the plastic bottle, and wherein the outer bottom mold and the inner bottom mold are provided with a second cooling mechanism.

3. The blow molding mold for a plastic bottle according to claim 1, wherein the bottom mold is formed as a single integral member and is provided with a second cooling mechanism.

4. The blow molding mold for a plastic bottle according to claim 1, further comprising an enclosure located outside the outer shell.

5. The blow molding mold for a plastic bottle according to claim 4, wherein the enclosure is provided with a heating mechanism.

6. The blow molding mold for a plastic bottle according to claim 1, wherein the outer shell is in engagement with the bottom mold.

7. The blow molding mold for a plastic bottle according to claim 1, wherein the first cooling mechanism has an inlet and an outlet which communicate with the coolant flow passage, wherein the coolant flow passage of the first cooling mechanism comprises an inlet-side coolant flow passage which communicates with the inlet, and an outlet-side coolant flow passage which is continuous with the inlet-side coolant flow passage and communicates with the outlet, and wherein at least one of the inlet-side coolant flow passage and the outlet-side coolant flow passage overlaps the inner body mold in a plan view.

8. The blow molding mold for a plastic bottle according to claim 7, wherein both of the inlet-side coolant flow passage and the outlet-side coolant flow passage overlap the inner body mold in a plan view.

9. The blow molding mold for a plastic bottle according to claim 7, wherein the inlet-side coolant flow passage and the outlet-side coolant flow passage each have a crescent shape in a plan view.

10. The blow molding mold for a plastic bottle according to claim 7, wherein the inlet-side coolant flow passage and the outlet-side coolant flow passage each include a plurality of linear portions.

11. The blow molding mold for a plastic bottle according to claim 10, wherein branched portions are connected to the linear portions of the inlet-side coolant flow passage or the outlet-side coolant flow passage.

12. The blow molding mold for a plastic bottle according to claim 1, wherein an insulating space is formed between the neck mold and the inner body mold.

13. The blow molding mold for a plastic bottle according claim 2, further comprising an enclosure located outside the outer shell.

14. The blow molding mold for a plastic bottle according claim 3, further comprising an enclosure located outside the outer shell.

15. The blow molding mold for a plastic bottle according to claim 13, wherein the enclosure is provided with a heating mechanism.

16. The blow molding mold for a plastic bottle according to claim 14, wherein the enclosure is provided with a heating mechanism.

17. The blow molding mold for a plastic bottle according to claim 8, wherein the inlet-side coolant flow passage and the outlet-side coolant flow passage each have a crescent shape in a plan view.

18. The blow molding mold for a plastic bottle according to claim 8, wherein the inlet-side coolant flow passage and the outlet-side coolant flow passage each include a plurality of linear portions.

19. The blow molding mold for a plastic bottle according to claim 18, wherein branched portions are connected to the linear portions of the inlet-side coolant flow passage or the outlet-side coolant flow passage.

\* \* \* \* \*